June 6, 1967 W. L. GARFIELD 3,324,391
ELECTRICAL PULSE RATE COUNTER CIRCUIT
Filed July 7, 1964 2 Sheets-Sheet 1

Inventor
WILLIAM LITTERY GARFIELD
BY Percy P. Lantzy
Attorney

Inventor
WILLIAM LITTERY GARFIELD
By Percy P. Lantzy
Attorney

United States Patent Office 3,324,391
Patented June 6, 1967

3,324,391

ELECTRICAL PULSE RATE COUNTER CIRCUIT

William Littery Garfield, London, England, assignor to International Standard Electric Corporation, New York, N.Y., a corporation of Delaware Filed July 7, 1964, Ser. No. 380,795
Claims priority, application Great Britain, Oct. 18, 1963, 41,236/63
7 Claims. (Cl. 324—78)

This invention relates to electrical counter circuits for counting the number of cycles of an electrical wave occurring in a given time.

Counter circuits of the above type which operate by counting the number of times an electrical wave crosses a reference voltage axis in a given time are liable to produce errors if the electrical wave is accompanied by electrical noise. This is because the counter circuit does not discriminate between transitions due to the cyclic variations of the electrical wave voltage and unwanted transitions of the electrical wave due to the presence of the noise. The persent invention aims at reducing the error produced by the unwanted transitions of the electrical wave being counted.

According to the invention there is provided an electrical counter to measure the number of cycles of an electrical wave occurring in a given time including a capacitor coupled to a switching arrangement arranged to connect the capacitor to a voltage source through a charging network in response to one operating signal, the switching arrangement being arranged to connect the capacitor to a discharging network in response to another operating signal, means to produce one of the operating signals when the voltage of the electrical wave is positive with respect to one particular value, means to produce the other of the said operating signals when the voltage of the electrical wave is negative with respect to another particular value, and indicator means responsive to the current in either the charging network or the discharging network averaged over a period of time.

Figure 1:
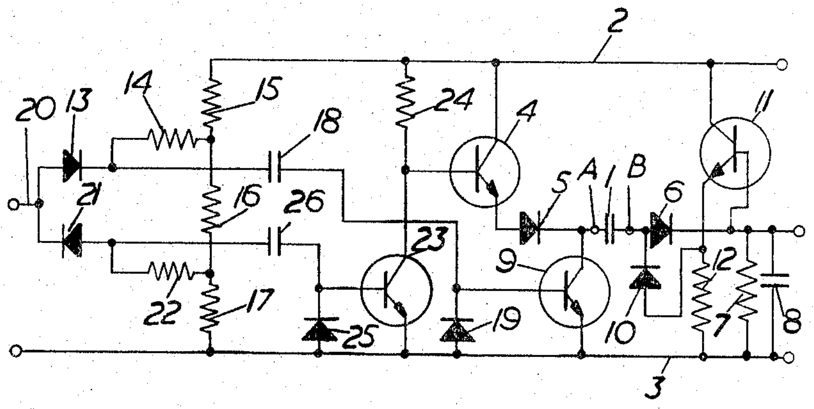

An embodiment of the invention in a F.M. radio altimeter receiver will not be described with reference to the accompanying drawings, of which:

FIG. 1 is a circuit diagram of the embodiment,

FIGS. 2 A–C show waveforms illustrating the operation of the circuit, and

FIGS. 3 A–D show waveforms illustrating the operation of the circuit in the presence of a large amount of noise.

Referring to FIG. 1 there is shown a capacitor 1 having two terminals, A and B. Terminal A of the capacitor 1 is connected to a conductor 2 through the collector-emitter path of a NPN transistor 4 and a semiconductor diode 5. Terminal A is also connected to a conductor 3 via the collector-emitter path of a NPN transistor 9. Terminal B of the capacitor 1 is connected to the conductor 2 via the collector-emitter path of a NPN transistor 11 and a semiconductor diode 10. The emitter of the transistor 11 is connected to the conductor 3 through a resistor 12. Terminal B of the capacitor 1 is connected to the conductor 3 through a semi-conductor diode 6 in series with a resistor 7 shunted by a capacitor 8. The junction of the diode 6 with the parallel combination of the resistor 7 and the capacitor 8 is connected to the base terminal of the transistor 11.

The two conductors 2 and 3 are respectively connected to the positive and negative terminals of a D.C. voltage supply.

When the capacitor 1 is charged terminal A becomes positive with respect to terminal B due to the flow of a charging current from the conductor 2 into the capacitor 1 via the transistor 4 and the diode 5, and an opposite charging current flow from terminal B of the capacitor 1 to the conductor 3 via the diode 6, the capacitor 8 and the resistor 7.

During discharge of the capacitor 1 a current flows from teminal A to the conductor 3 via the collector-emitter path of the transistor 9, and a corresponding current flows into the capacitor 1 at terminal B from conductor 2 via the collector-emitter path of the transistor 11 and the diode 10. The transistor 11 tends to make the discharge of capacitor 1 a linear function of time.

The charging current of the capacitor 1 flows through the resistor 7 but the discharging current does not. By making the capacitance of the capacitor 8 much larger than the capacitance of the capacitor 1, the capacitor 8 acts as a reservoir of charge for the capacitor 1 and the average value of the charging current of the capacitor 1 over a period of time dependent upon the product of the values of the capacitor 1 and the resistor 7 can be determined by measuring the voltage drop across the resistor 7 or by inserting a D.C. current meter in series with the resistor. The average value of the charging current of the capacitor 1 is proportional to the number of times per second in which the capacitor 1 is charged, provided that the CR product of the capacitor 8 and the resistor 7 is large compared with the reciprocal of the frequency of charging of the capacitor 1.

The charging and discharging of the capacitor 1 is initiated by pulses from the output of two amplitude discriminator circuits. A first amplitude discriminator circuit comprises a rectifier device 13, which in the embodiment of the invention is a semiconductor diode, having one electrode connected via a resistor 14 to the junction of two series resistors 15 and 16, which together with a third resistor 17 are connected in series between the conductors 2 and 3. The first amplitude discriminator is coupled to the transistor 9 by means of a capacitor 18 connected between the junction of the diode 13 with the resistor 14 and the base of the transistor 9. A rectifier device 19, which in the embodiment of the invention is a semiconductor diode, is connected between the base terminal of the transistor 9 and the conductor 3. The other electrode of the diode 13 is connected to a conductor 20.

The polarity of the connections of the diode 13 is such that the device conducts only if the potential of the conductor 20 becomes positive with respect to the potential of the junction of the resistors 15 and 16.

A second amplitude discriminator comprises a rectifier device 21, which in the embodiment of the invention is a semiconductor diode, having one electrode connected through a resistor 22 to the junction of the resistors 16 and 17. The second electrode of the diode 21 is connected to the conductor 20. The polarity of the connections of the diode 21 is such that it conducts only if the potential of the terminal 20 is negative with respect to the potential of the junction of the resistors 16 and 17.

The base terminal of the transistor 4 is connected to the collector of a NPN transistor 23 which acts as a polarity reversing, coupling element between the output of the second amplitude discriminator and the base of the transistor 4. The emitter of the transistor 23 is connected to the negative conductor 3 and the collector is connected to the positive conductor 2 through a load resistor 24.

A rectifier device 25, which in the embodiment of the invention is a semiconductor diode, is connected between the base terminal of the transistor 23 and the conductor 3. The polarity of the diode 25 is such that it conducts when the base of the transistor 23 is negative with respect to the conductor 3. The junction of the diode 21 with the resistor 22 is coupled to the base terminal of the transistor 23 via a capacitor 26.

The electrical wave of which it is required to count the number of cycles occurring in a given time is applied between the conductors 20 and 3. In the embodiment of the invention the electrical wave is a beat frequency signal obtained by amplitude limiting the output from a mixer in which a signal transmitted from the altimeter transmitter and received by reflection from the ground is beaten with a signal received from the transmitter over a direct leakage path of fixed length. The frequency of the electrical wave varies approximately sinusoidally with time with a periodicity of $\frac{1}{300}$ second. The mean value of the electrical wave frequency may vary between 1 and 400 kc./s. depending upon the altitude of the altimeter and under certain conditions the wave may be accompanied by electrical noise.

Figure 2A:
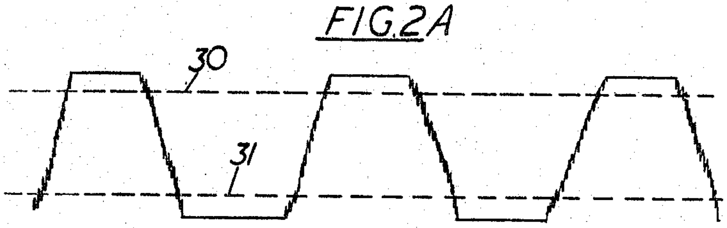

A typical voltage waveform of the electrical wave to be measured in the presence of electrical noise is shown in FIG. 2A. Owing to amplitude limiting before application to the counter the signal wave is of constant amplitude and the upper and lower edges of the signal wave are free from noise. If such a wave were applied to the input of a counter directly responsive to transitions of the wave through a single voltage level in either direction false counts might be recorded owing to the noise superimposed on the sloping edges of the signal wave. The extent of the interference would depend upon the sensitivity of the counter and the magnitude of the noise transitions.

In the embodiment of the invention the junction of the resistors 14 and 16 is maintained at a steady positive potential with respect to the conductor 3. This potential is represented by the dotted line 30 in FIG. 2A. The diode 13 conducts only when the positive excursions of the wave to be counted exceed the value represented by the line 30, corresponding to about 90% of the peak positive voltage.

The junction of the resistors 16 and 17 is at a steady positive potential with respect to the conductor 3 and is represented by the dotted line 31 in FIG. 2A. The diode 21 conducts only when the voltage of the wave to be counted becomes negative with respect to the value represented by the line 31, corresponding to about 10% of the peak positive voltage.

Figure 2B:
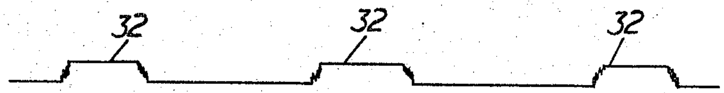

The signal voltage waveform at the junction of the diode 19 with the capacitor 18 is shown in FIG. 2B. This signal represents the output signal from the first amplitude discriminator. The base of the transistor 9 is driven positive with respect to the emitter during the periods 32 in FIG. 2B, corresponding to the voltage of the wave to be counted becoming positive with respect to the voltage indicated by the line 30. When the base of the transistor 9 is driven positive with respect to the emitter it conducts and the capacitor 1 is fully discharged through the collector-emitter impedance of the transistor 9, the diode 10 and the collector-emitter impedance of the transistor 11. At all times at which the voltage of the wave to be counted is negative with respect to that represented by the line 30 and the diode 13 is nonconducting. and the transistor 9 is nonconducting.

Figure 2C:
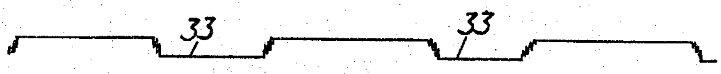

The signal voltage waveform at the junction of the diode 25 with the capacitor 26 is shown at FIG. 2C. This signal represents the output signal from the second amplitude discriminator. The base of the transistor 23 is driven in a negative direction towards the emitter potential during the periods 33 in FIG. 2C in which the voltage of the wave to be counted becomes negative with respect to the voltage represented by the line 31. The transistor 23, which at other times is in the conducting state, is thereby cut off and the potential of its collector with respect to the conductor 3 becomes equal to that of the positive conductor 2. The base of the transistor 4 acquires the potential of the conductor 2 since it is directly connected to the collector of the transistor 23. Transistor 4, which at other times is nonconducting, conducts and the capacitor 1 becomes fully charged with current drawn from the capacitor 8 and which flows through the collector-emitter impedance of the transistor 4 and also the diode 5.

When the voltage of the wave to be counted is positive with respect to the voltage represented by the line 31, the diode 21 is non-conducting, and the base of the transistor 23 becomes positive with respect to the emitter, causing the transistor to conduct. This results in the transistor 4 being cut-off because the base becomes negative with respect to the emitter.

When the base of the transistor 4 is negative with respect to the emitter the impedance of the base-emitter path may not be infinite owing to the occurrence of the Zener Effect. But under the above condition the diode 5 is reverse-biassed and therefore no path exists whereby the capacitor 1 may inadvertently be charged.

The signal waveform shown at FIG. 2B controls the discharging of the capacitor 1; it cannot initiate charging of the capacitor 1. The signal waveform shown at FIG. 2C controls the charging of the capacitor 1; it cannot initiate discharging of the capacitor 1. The edges of the wave to be counted are always sloping, consequently the periods 32 and 33 never overlap in time. The capacitor 1 is therefore charged and discharged only once per cycle of the wave to be counted, even when there is noise on the edges. The separation between the voltages represented by the lines 30 and 31 must be greater than the excursion of the largest noise pulse.

The operation of the counter circuit when the signal reflected from the ground to the receiver is of poor quality will be illustrated with reference to FIG. 3 of the accompanying drawings.

Figures 3A, 3B, 3C, 3D:
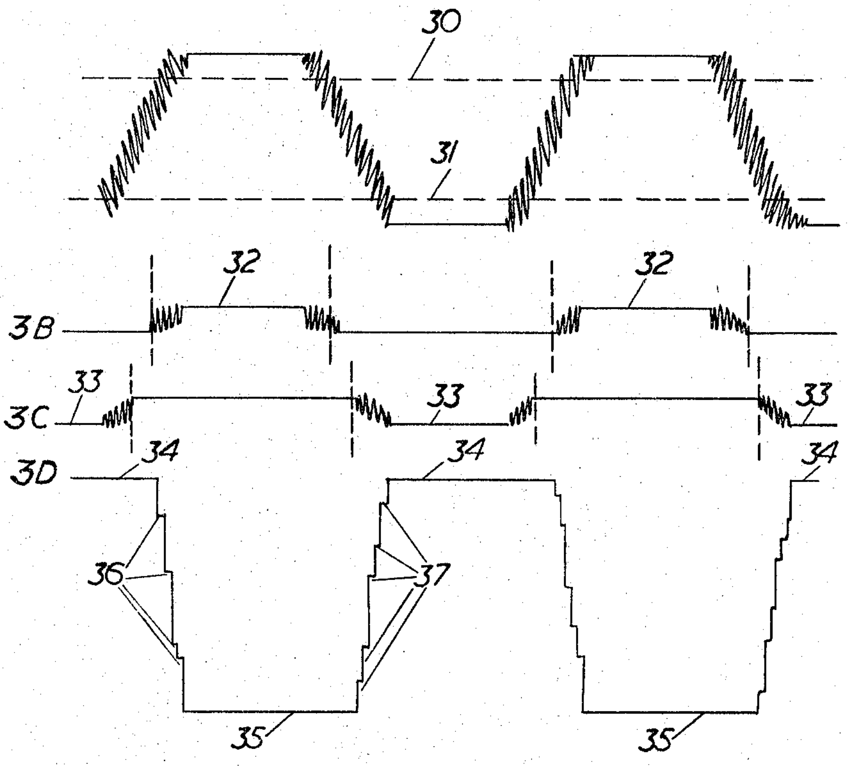

FIG. 3A shows the waveform of the input signal between conductors 20 and 3 of the counter. Due to the weakness of the ground reflected signal the threshold of the amplitude limiting stage prior to the counter will only just be reached and the edges of the output signal from the limiter will therefore be very noisy. If this noisy signal were applied to a counter of the type responsive to the transitions of the signal wave about a signal fixed voltage axis, the indication provided by the counter would be in considerable error owing to the large number of unwanted counts introduced by the noise.

The voltage waveforms at the junction of the diode 13 and the resistor 14, and at the junction of the diode 21 and the resistor 22 are shown at FIGS. 3B and 3C respectively. In the case of FIG. 3B the discharge of the capacitor 1 may be commenced by noise superposed on the wanted signal, but neither the noise nor the wanted signal can cause capacitor 1 to be charged. In the case of FIG. 3C the charging of the capacitor 1 may be commenced by noise superposed on the wanted signal wave, but neither the noise nor the wanted signal voltage can cause it to be charged. There is no overlap between the periods 32 and 33 and hence, as before, the capacitor 1 will only be charged and discharged once per cycle of the wave to be counted.

FIG. 3D shows the potential developed across the capacitor 1 under these conditions. The upper horizontal portion 34 of the wave represents the potential across the capacitor when fully charged. The lower horizontal portion 35 of the wave represents the potential across the capacitor when fully discharged.

During the first part of the period 32 the noise spikes cause the transistor 9 to be switched on in a series of short pulses, causing the discharging of the capacitor 1 to commence in a series of steps, some of which are shown at 36, which never change direction. During the part of the period 32 corresponding to the flat top of the signal wave the discharge is completed and the potential across the capacitor 1 falls to the value represented by the lower horizontal portion 35 of the wave.

During the first part of the period 33 the noise spikes cause the transistor 4 to be switched on in a series of short pulses which never change direction. The capacitor 1 becomes charged on a series of steps 37 which never change direction. During the part of the period 33 corresponding to the flat top of the signal wave the charge is completed and the potential across the capacitor 1 rises to the value represented by the upper horizontal portion 34 of the wave. It does not matter in how many steps the capacitor 1 is charged or discharged. Provided that the steps do not change direction at one edge of the wave to be counted, the count will not be affected.

It is emphasised that the inclusion of the transistor 11 in the discharging circuit of the capacitor 1 is only for the purpose of linearising the discharge and is not absolutely essential for the operation of the invention. The semiconductor devices used in the embodiment of the invention may be replaced by equivalent thermionic devices. In the embodiment of the invention it is necessary for the amplitude of the wave to be measured to always be sufficiently large to overcome the reverse bias on the diodes 13 and 21. The electrical wave to be measured is therefore amplitude limited before application to the input conductor 2C of the counter in order to ensure that this requirement is met. In cases where the amplitude of the input electrical wave is sufficiently small the limiter is not required.

In the embodiment of the invention described the indicator provides an indication dependent upon the charging current of the capacitor. In other embodiments of the invention it may sometimes be more convenient to connect the indicator in such a way that the indication is dependent upon the discharging current of the capacitor.

What I claim is:

1. An electrical counter to measure the number of cycles of an electrical wave occurring in a given time, comprising:

a first threshold circuit having a first threshold level;

a second threshold circuit having a second threshold level different from said first threshold level;

means for applying said electrical wave to said first and second threshold circuits;

a capacitor;

a network for charging said capacitor;

a network for discharging said capacitor;

a first switching arrangement for coupling said charging network to said capacitor upon said electrical wave crossing the threshold level of said first threshold circuit;

a second switching arrangement for coupling said discharging network to said capacitor upon said electrical wave crossing the threshold level of said second threshold circuit; and means responsive to the average one-way current through said capacitor, averaged over a period of time.

2. An electrical counter as claimed in claim 1 in which said charging network includes a rectifier device, and a reservoir capacitor in parallel with a leak resistor coupled thereto.

3. An electrical counter as claimed in claim 2 in which said first threshold circuit includes a diode to which a steady reverse bias is applied, said diode being coupled between said means for applying said electrical wave and said second switching arrangement.

4. An electrical counter as claimed in claim 1 in which said first switching arrangement includes a transistor the collector-emitter path of which is coupled between said capacitor and said charging network.

5. An electrical counter as claimed in claim 1 in which said second switching arrangement includes a transistor the collector-emitter path of which forms said part of a discharging network for said capacitor.

6. An electrical counter as claimed in claim 4 in which a semiconductor diode is coupled between the collector or the emitter terminal of the said transistor and one terminal of the capacitor.

7. An electrical counter as claimed in claim 5 in which the discharge network includes a diode in series with the collector emitter path of a transistor the base of which is at a substantially fixed potential.

References Cited

UNITED STATES PATENTS 3,099,799 7/1963 Bahrs et al. -------- 324—78 X

OTHER REFERENCES

Electronics for Scientists, Malmstadt and Enke, Benjamin, Inc., New York, 1963, pp. 412–413.

WALTER L. CARLSON, *Primary Examiner.*

P. F. WILLE, *Assistant Examiner.*